United States Patent
Meiri et al.

(10) Patent No.: US 9,037,822 B1
(45) Date of Patent: May 19, 2015

(54) HIERARCHICAL VOLUME TREE

(71) Applicant: EMC Corporation, Hopkinton, MA (US)

(72) Inventors: David Meiri, Cambridge, MA (US); Ido Halevi, Givat Ada (IL)

(73) Assignee: EMC Corporation, Hopkinton, MA (US)

( * ) Notice: Subject to any disclaimer, the term of this patent is extended or adjusted under 35 U.S.C. 154(b) by 138 days.

(21) Appl. No.: 14/037,511

(22) Filed: Sep. 26, 2013

(51) Int. Cl.
*G06F 13/00* (2006.01)
*G06F 13/28* (2006.01)
*G06F 3/06* (2006.01)

(52) U.S. Cl.
CPC .............. *G06F 3/065* (2013.01); *G06F 3/0619* (2013.01); *G06F 3/067* (2013.01)

(58) Field of Classification Search
CPC .............................. G06F 3/0619; G06F 3/065
See application file for complete search history.

(56) References Cited

U.S. PATENT DOCUMENTS

| | | | |
|---|---|---|---|
| 5,860,137 A | 1/1999 | Raz et al. | |
| 6,643,654 B1 | 11/2003 | Patel et al. | |
| 7,827,136 B1 * | 11/2010 | Wang et al. | 707/610 |
| 7,908,436 B1 | 3/2011 | Srinivasan et al. | |
| 8,200,923 B1 | 6/2012 | Healey et al. | |
| 8,478,951 B1 | 7/2013 | Healey et al. | |
| 2005/0125626 A1 | 6/2005 | Todd | |
| 2005/0144416 A1 | 6/2005 | Lin | |
| 2005/0193084 A1 | 9/2005 | Todd et al. | |
| 2006/0031653 A1 | 2/2006 | Todd et al. | |
| 2009/0222596 A1 | 9/2009 | Flynn et al. | |
| 2010/0042790 A1 | 2/2010 | Mondal et al. | |
| 2010/0180145 A1 | 7/2010 | Chu | |
| 2010/0205330 A1 * | 8/2010 | Noborikawa et al. | 710/38 |
| 2011/0099342 A1 * | 4/2011 | Ozdemir | 711/162 |
| 2012/0124282 A1 | 5/2012 | Frank et al. | |

FOREIGN PATENT DOCUMENTS

| | | |
|---|---|---|
| EP | 1804157 | 7/2007 |
| WO | WO 2010/019596 | 2/2010 |
| WO | WO 2010/040078 | 4/2010 |
| WO | WO 2012/066528 | 5/2012 |

OTHER PUBLICATIONS

Halevi et al.; "Synchronization of Volumes;" U.S. Appl. No. 14/034,981, filed Sep. 24, 2013; 46 pages.
Ben-Moshe et al.; "Hash-Based Replication;" U.S. Appl. No. 14/037,577, filed Sep. 26, 2013; 43 pages.
(Continued)

*Primary Examiner* — Eric S Cardwell
(74) *Attorney, Agent, or Firm* — Daly, Crowley, Mofford & Durkee, LLP

(57) ABSTRACT

In one aspect, a method includes receiving notification that a volume in a plurality of volumes has failed, determining a smallest consistency group with a replication trigger point designation using a hierarchical volume tree that includes the failed volume, stopping replication of volumes in a first consistency group if it is determined that the first consistency group is the smallest consistency group with a replication trigger point that includes the failed volume and stopping replication of the plurality of volumes if it is not determined which is the smallest consistency group with a replication trigger point that includes the failed volume.

19 Claims, 7 Drawing Sheets

(56) References Cited

OTHER PUBLICATIONS

Meiri et al.; "Data Reduction Techniques in a Flash-Based Key/Value Cluster Storage;" U.S. Appl. No. 14/230,405, filed Mar. 31, 2014; 46 pages.
Meiri; "Encrypting Data in a Flash-Based Contents-Addressable Block Device;" U.S. Appl. No. 14/230,414, filed Mar. 31, 2014; 41 pages.
Halevi et al.; "Hash-Based Replication Using Short Hash Handle and Identity Bit;" U.S. Appl. No. 14/317,449, filed Jun. 27, 2014; 45 pages.
Meiri et al.; "Adjusting Consistency Groups During Asynchronous Replication;" U.S. Appl. No. 14/494,895, filed Sep. 24, 2014; 45 Pages.
Chen et al.; "Suspending Data Replication;" U.S. Appl. No. 14/494,899, filed Sep. 24, 2014; 40 Pages.
U.S. Appl. No. 12/945,915; 200 Pages.
U.S. Appl. No. 12/945,915; 108 Pages.
PCT Advance E-Mail Transmittal of IPR dated May 30, 2013 corresponding to Pat. App. No. PCT/IL2011/000692; 1 Page.
PCT International Preliminary Report dated May 30, 2013 corresponding to Pat. App. No. PCT/IL2011/000692; 1 Page.
PCT Written Opinion of the ISA dated May 30, 2013 corresponding to Pat. App. No. PCT/IL2011/000692; 5 Pages.
PCT Notification of Transmittal of ISR and Written Opinion dated Dec. 1, 2011 corresponding to Pat. App. No. PCT/IL2011/000692; 1 Page.
PCT International Search Report dated Dec. 1, 2011 corresponding to Pat. App. No. PCT/IL2011/000692; 4 Pages.
PCT Written Opinion of the ISA dated Dec. 1, 2011 corresponding to Pat. App. No. PCT/IL2011/000692; 5 Pages.
Renen Hallak, et al.; "Generating A Short Hash Handle," U.S. Appl. No. 14/037,626, filed Sep. 26, 2013 42 pages.

\* cited by examiner

HIERARCHICAL VOLUME TREE

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving notification that a volume in a plurality of volumes has failed, determining a smallest consistency group with a replication trigger point designation using a hierarchical volume tree that includes the failed volume, stopping replication of volumes in a first consistency group if it is determined that the first consistency group is the smallest consistency group with a replication trigger point that includes the failed volume and stopping replication of the plurality of volumes if it is not determined which is the smallest consistency group with a replication trigger point that includes the failed volume.

In another aspect, an apparatus, includes electronic hardware circuitry configured to receive notification that a volume in a plurality of volumes has failed, determine a smallest consistency group with a replication trigger point designation using a hierarchical volume tree that includes the failed volume, stop replication of volumes in a first consistency group if it is determined that the first consistency group is the smallest consistency group with a replication trigger point that includes the failed volume and stop replication of the plurality of volumes if it is not determined which is the smallest consistency group with a replication trigger point that includes the failed volume.

In a further aspect, an article includes a non-transitory computer-readable medium that stores computer-executable instructions. The instructions causing a machine to receive notification that a volume in a plurality of volumes has failed, determine a smallest consistency group with a replication trigger point designation using a hierarchical volume tree that includes the failed volume, stop replication of volumes in a first consistency group if it is determined that the first consistency group is the smallest consistency group with a replication trigger point that includes the failed volume and stop replication of the plurality of volumes if it is not determined which is the smallest consistency group with a replication trigger point that includes the failed volume.

DETAILED DESCRIPTION

Described herein are techniques for arranging storage devices in a hierarchical structure that supports a wide range of conflicting applications. For example, the techniques described herein enable a feature to concurrently support setting consistency groups by an application granularity, snapshots by departmental granularity, remote replication triggers by datacenter granularity, backup of any application, security at the single device level, quality of service parameters by device type, all while enabling management operations at any level of the hierarchy.

The techniques described herein allow a user to configure millions of storage devices (volumes), for example, in an easy-to-manage hierarchical structure, where management operations in different areas such as remote replication, snapshot, security, QOS, backup, configuration, and so forth can be executed at any granularity. Furthermore, the techniques described herein allow one to easily move remote-replication triggers up and down the hierarchical structure, switching dynamically from enterprise consistency to other levels without reconfiguring the grouping of storage devices.

Figure 1:
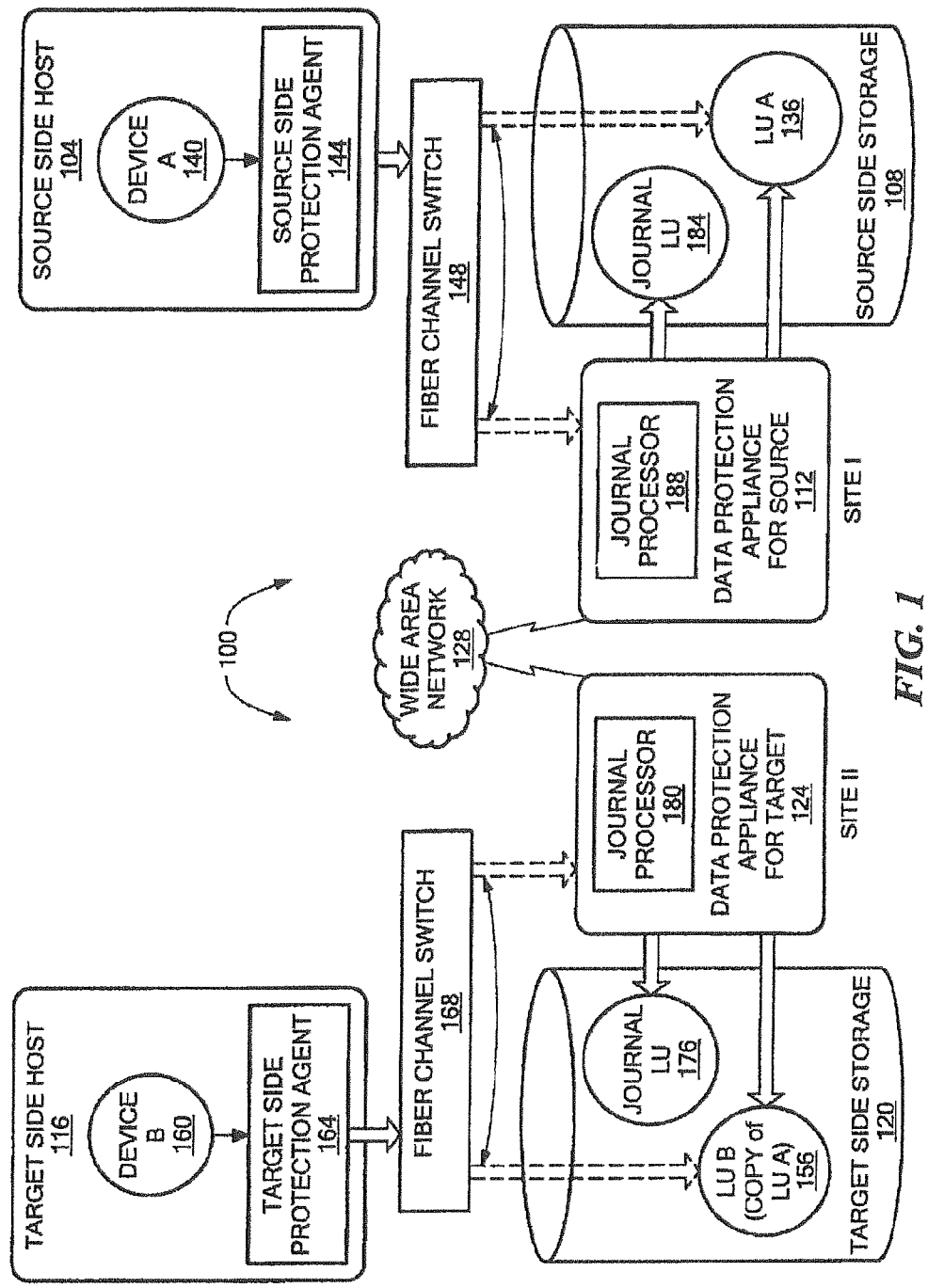
FIG. 1 is a block diagram of an example of a data protection system.
Figure 2:
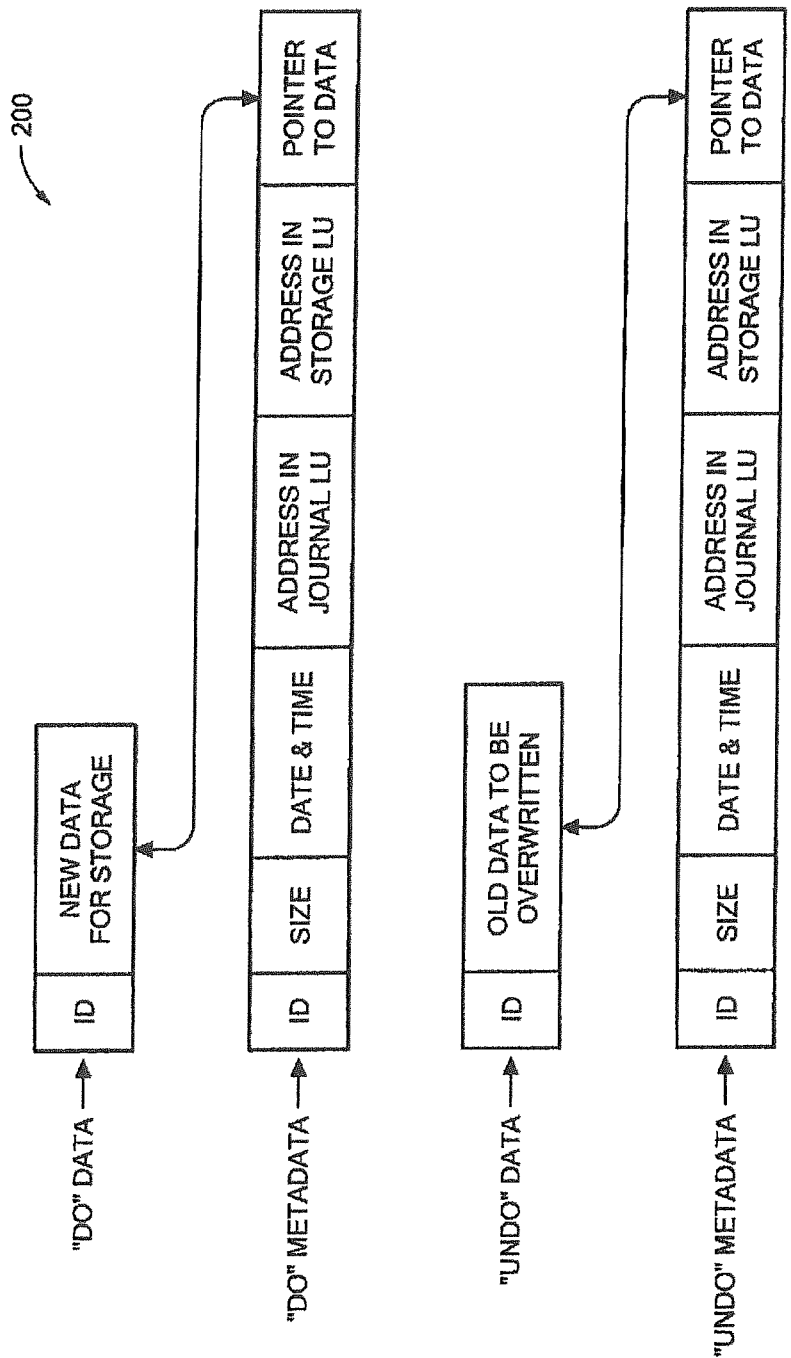
FIG. 2 is an illustration of an example of a journal history of write transactions for a storage system.

Before describing a hierarchical volume tree, it is useful to discuss an example of system for which the techniques described herein may be implemented, for example, a data protection system 100 described in FIGS. 1 and 2. One of ordinary skill in the art would recognize that the techniques described herein may be applied to other type system with storage devices.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Before describing a replication system that includes a deduplication based storage volume, an example replication system is first described in FIGS. 1 and 2.

An Example of a Replication System

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
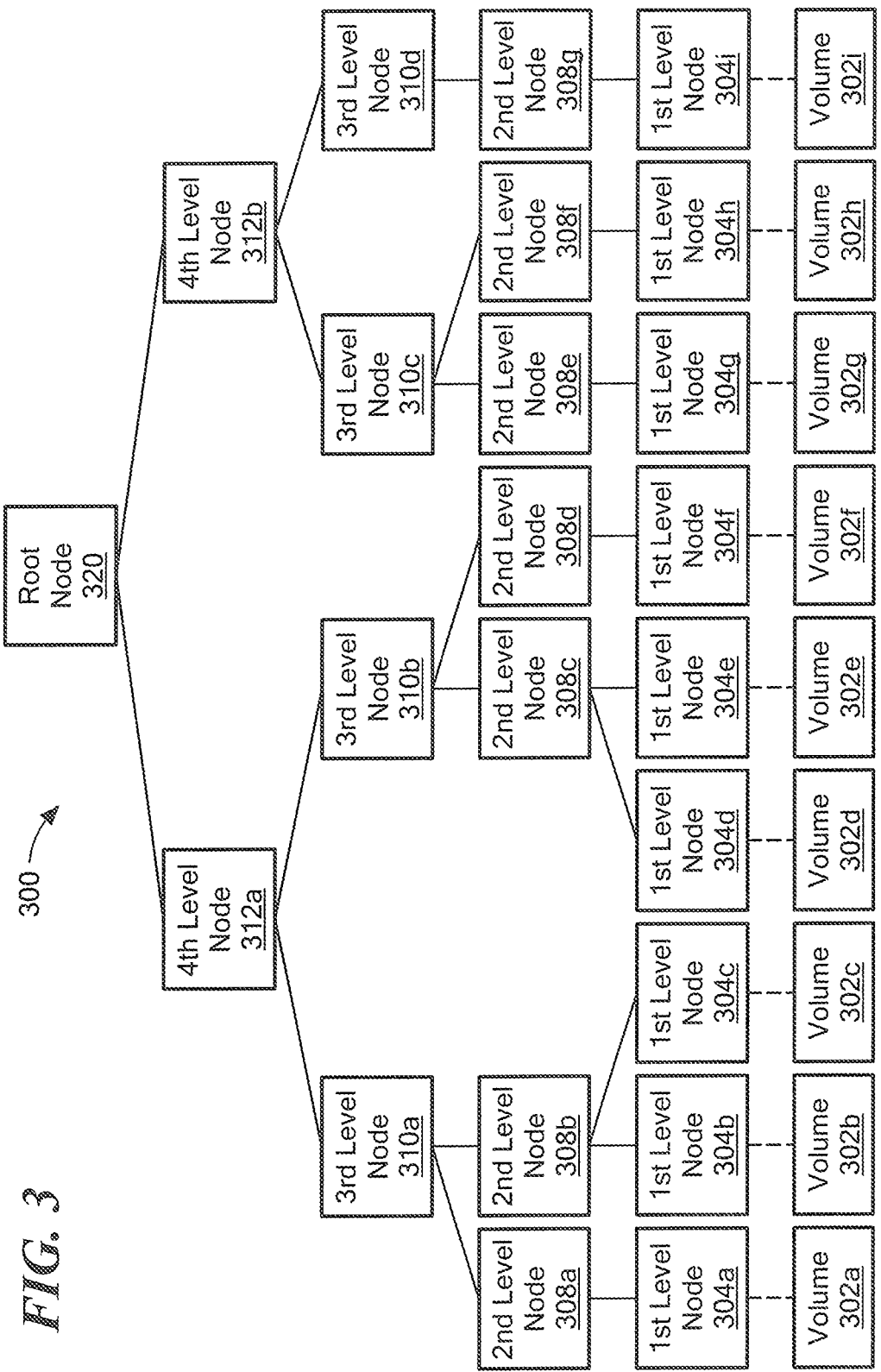
FIG. 3 is a simplified block diagram of an example of a hierarchical volume tree.

Referring to FIG. 3, while the data protection system 10 shows a single volume being replicated, system 10 may be used to replicate hundreds or even thousands or millions of volumes. A hierarchical tree can be used to manage all these volumes. Further, the hierarchical tree may be used to by a user to define consistency groups and designate some of them as replication trigger points. A replication trigger point (RTP) is an attribute of a consistency group that is used during remote replication failure.

A consistency group designated as a replication trigger point defines a consistency domain for failures in remote replication. For example, if replication fails for any volume in a consistency group designated as a replication trigger point, then replication is suspended for all of the volumes in the group, leaving a consistent copy at the replication site. A consistency group also defines granularity of operations, whether or not it is designated as a replication trigger point. For example, in many remote replication management systems, a consistency group is the unit of operation such as for failing over an application.

Consistency groups can provide a logical organization of the volumes. For example, a customer may want to clone or take a snapshot of a consistency group, or set performance parameters for all volumes in a consistency group.

A hierarchical volume tree enables users to use a grouping mechanism for any operation that is allowed on a volume. For example, a customer may want to elevate the performance of a consistency group representing an application, or a consistency group representing an entire department.

The hierarchical volume tree obeys the following rules. First, a consistency group is a collection of volumes or a collection of other consistency groups. Second, each volume or consistency group can be part of exactly one consistency group. Third, any management operation allowed on a volume is also allowed on a consistency group. Some consistency groups are defined as replication trigger points and the root of the hierarchical volume tree is by default a replication trigger point. A consistency group that is not defined as a replication trigger point can still be used for management operations such as taking a snapshot or setting QOS, but will be ignored when a failure in remote replication triggers suspending a consistent set of volumes. In other words, only consistency groups that are designated as replication trigger point are used when the system described within needs to compute which volumes shall have their remote replication suspended due to a replication failure.

An example of a hierarchical volume tree is a hierarchical volume tree 300 that includes first level node 304a-304i also called leaf nodes. The first level nodes 304a-304i represent a corresponding one of volumes 302a-302i, respectively. The volume tree 300 also includes second level nodes 308a-308g, third level nodes 310a-310d, fourth level nodes 312a, 312b and a root node 320.

The second level nodes may represent applications or databases that use the volumes 302a-302i. For example, the second level node 308a uses the volume 304a, the second level node 308b uses the volumes 304b, 304c, the second level node 308c uses the volumes 304d, 304e, the second level node 308d uses the volume 304f, the second level node 308e uses the volume 304g, the second level node 308f uses the volume 304h and the second level node 308g uses the volume 304i.

The third level nodes 310a-310d may represent departments in a functional group that use a particular application or database. For example, the third level node 310a uses second level nodes 308a, 308b, the third level node 310b uses second level nodes 308c, 308d, the third level node 310c uses second level nodes 308e, 308f and the third level node 310d uses second level node 308g.

The fourth level node 312a, 312b may be a functional group such as finance, sales or engineering, for example. The fourth level may use third level nodes 310a, 310b and fourth level node 312b may use third level nodes 310c, 310d.

The root node 320 may represent a data center for a location, for example. The root node 320 uses fourth level nodes 312a, 312b.

Each of the second level nodes 308a-308g, as well as third level nodes 310a-310d, fourth level nodes 312a-312b or the root node 320 may each represent a consistency group. In particular, they represent volumes with some logical connections between them. The connection varies according to the level of the node in the volume tree 300. For the root node 320, the connection is that all the volumes inside this consistency group (volumes 302a-302i) are in the same data center. For second level node 308b, for example, the connection is that all the volumes inside it are in the same application (volumes 302b-302c). All management operations can be done at any level—for example, a user may take a snapshot for the consistency group represented by the second level node 308b (i.e., volumes 302b-302c) or may failover the consistency group represented by the root node 320 (i.e., volumes 302a-302i).

Using the hierarchical volume tree 300 any of nodes of the volume tree may be designated as a replication trigger point meaning that the replication of all of the volumes below the node designated as a replication trigger point is suspended consistently in case of a failure to replicate any of them.

For example, if the third level node 310b is designated as a replication trigger point then any failure in replicating volumes 302d-302f would suspend replication for volumes 302d-302f in a consistent fashion, leaving a consistent image of the volumes in the target site.

In another example, the third level nodes 310a-310d are designated as RTPs. If a failure occurs when replicating volume 302d, for example, only third level node 310b is suspended. The other three consistency groups continue to replicate normally. This means that third level node 310b is guaranteed to have a consistent image in the target site, but there's no guarantee of any consistency across 310a-310d.

In a further example, a user that would like to guarantee consistency across third level nodes 310a-310d needs to designate the root node 320 as a RTP. In this example, a failure replicating volume 302d (or any other volume for that matter) will consistently suspend replication for all the volumes 302a-302i, resulting in an image in the target side that is consistent across all applications and departments in the datacenter. A user can achieve a higher level of consistency, but any failure triggers suspending replication for all of the volumes. Thus a user can dynamically play with this trade-off by designating consistency groups as RTP or removing this designation. The user can, for example, fail over a particular consistency group (such as second level node 308a or third level node 310b) without impacting the rest of the datacenter. At other times, the user may keep the root node 320 as the only RTP, guaranteeing the highest level of consistency in the image on the target in case of a failure.

Figure 4:
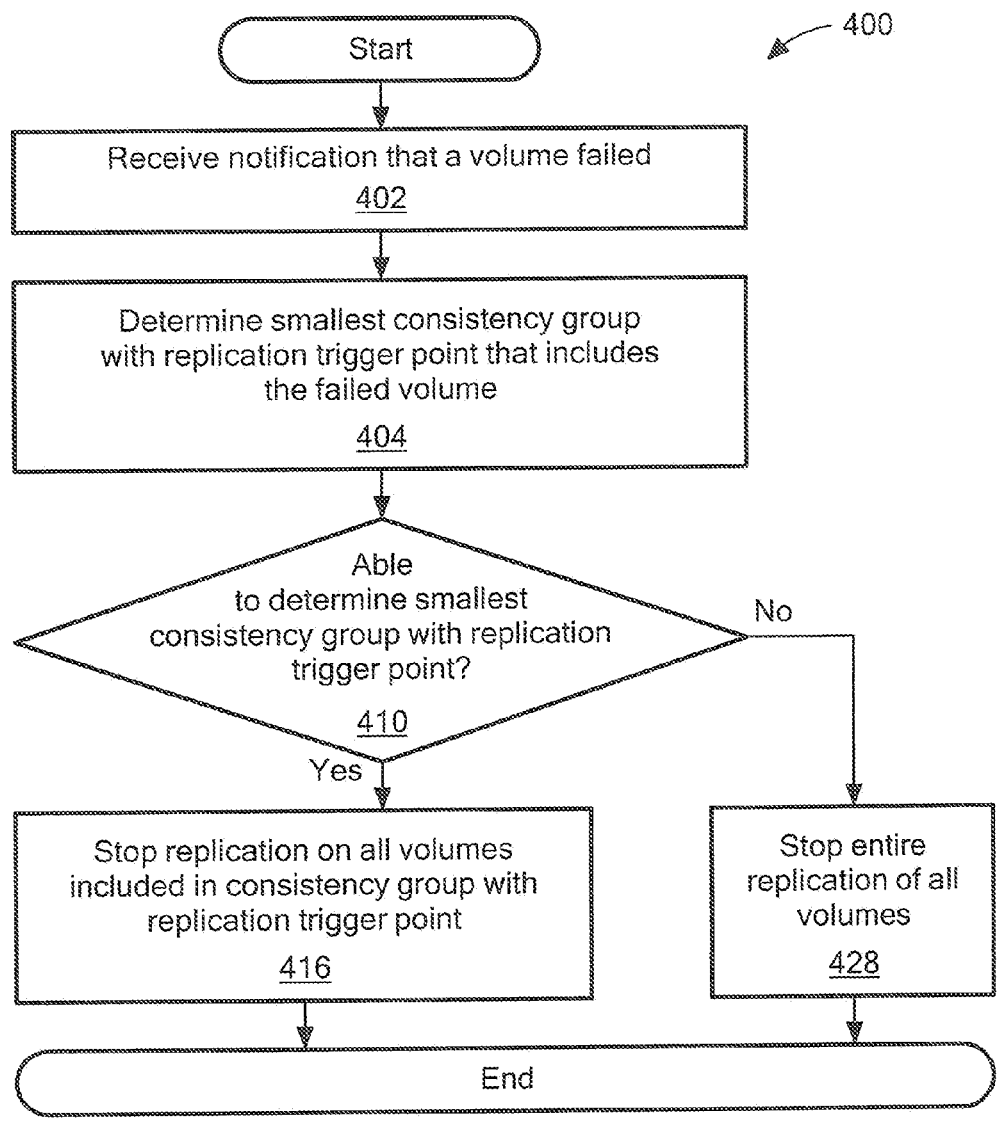
FIG. 4 is a flowchart of an example of a process to perform replication when a volume fails using a hierarchical volume tree.

Referring to FIG. 4, an example of a process to perform replication when a volume fails using a hierarchical volume tree is a process 400. Process 400 receives notification that a volume has failed (402) and determines the smallest consistency group with replication trigger point that includes the failed volume (404).

If process 400 determines it was able to determine the smallest consistency group with the failed volume (410), then process 400 stops replication on the volumes included in the consistency group (416). For example, in FIG. 3, a second level node 308b, a third level node 310b and a fourth level node 312b are designated as consistency points. The root node 312 is also designated a consistency point by default. If the volume 302e fails and process 400 determines that the smallest consistency group is designated by the third level node 310b then the volumes 302d-302f are included in the consistency group and replication is stopped on the volumes 302d-302f.

If process 400 is not able to determine the smallest consistency group with the failed volume then process 400 stops replication on all of the volumes (428). For example, replication on volumes 302a-302i are stopped.

Figure 5:
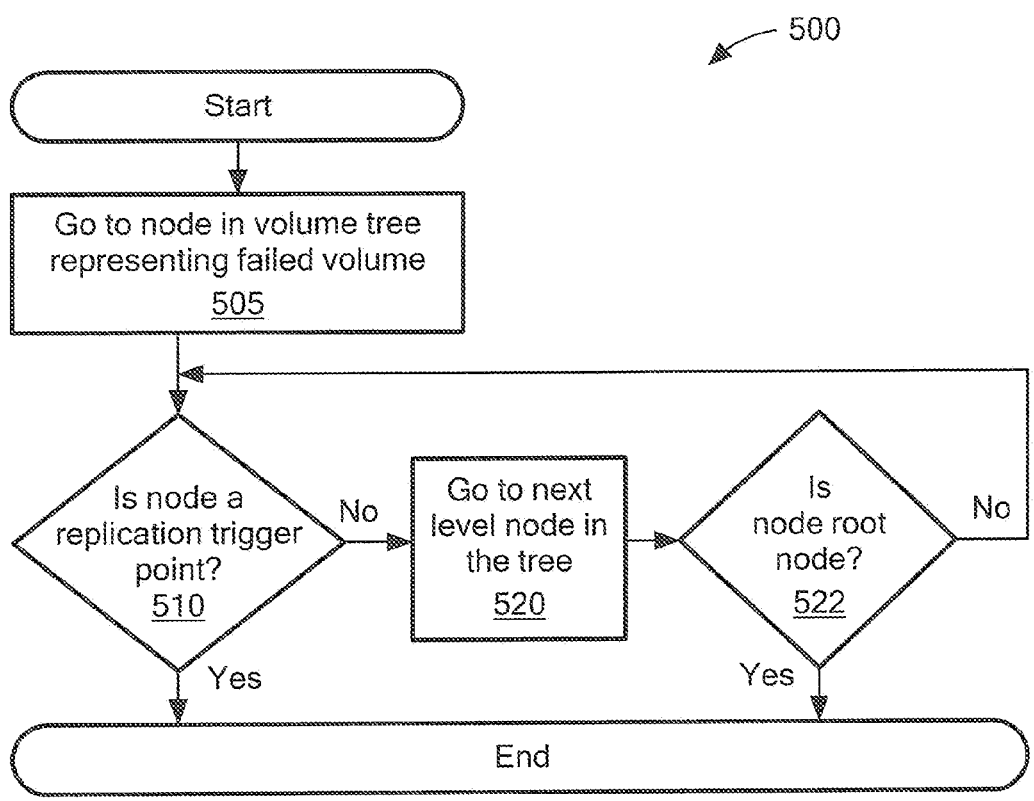
FIG. 5 is a flowchart of an example of a process to locate the smallest consistency group with a replication trigger point.

Referring to FIG. 5, an example of a process to locate the smallest consistency group with a replication trigger point (e.g., processing block 404 in FIG. 4) is a process 500. Process 500 goes to the node in the volume tree representing the failed volume (505). For example, if the volume 302c failed, then the process 500 would go to the first level node 304c in the volume tree 300.

Process 500 determines if the node is a replication trigger point (510) and if the node is not a replication trigger point, process 500 goes to the next level in the volume tree (520). For example, if the first level node 304c is not a replication trigger point, the second level node 308b is checked.

Figure 6:
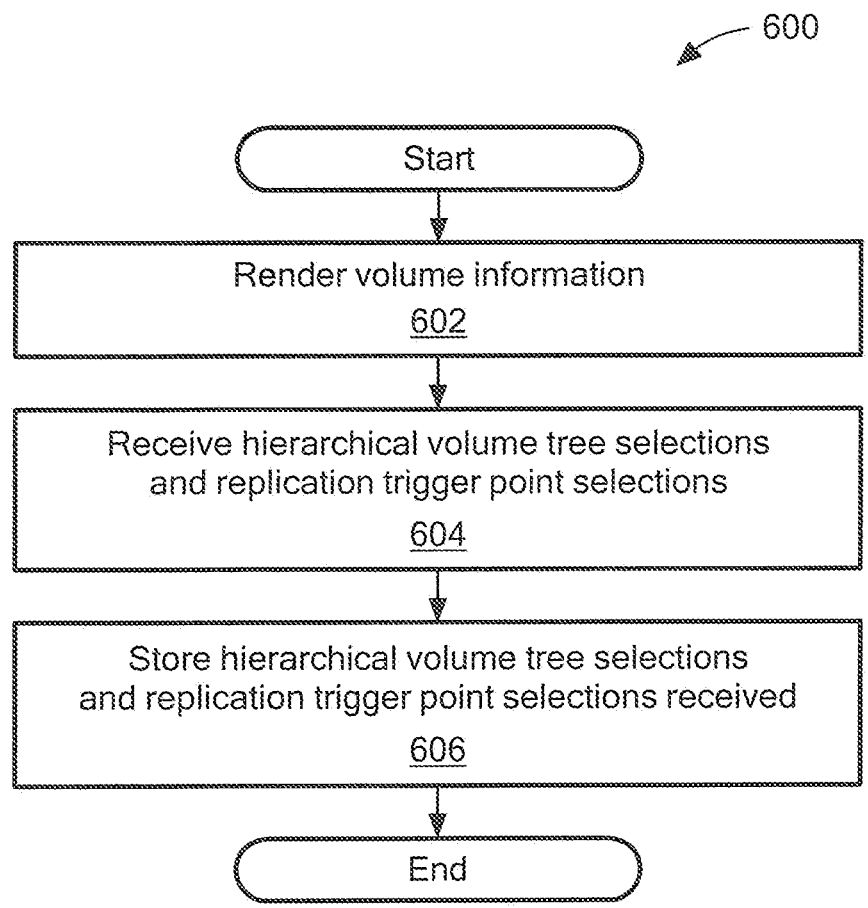
FIG. 6 is a flowchart of an example of a process to configure a hierarchical volume tree to include at least one consistency group.

Process 500 determines if the next level in the volume tree is a root node (522). If the next level node in the volume tree is a root node, process 500 ends. If the next level node is not a root node process 500 repeats processing block 510. Referring to FIG. 6, an example of a process to configure a hierarchical volume tree to include at least one consistency group is a process 600. Process 600 renders volume information to a user (602). For example, volume information is presented to a user so that a user may define a hierarchical tree or the user is presented with an already generated hierarchical tree.

Process 600 receives hierarchical volume tree selections and replication trigger point selections (604). For example, process 600 receives the user defined or modified hierarchical volume tree selections and replication trigger point selections. Process 600 stores the hierarchical volume tree selections and the replication trigger point selections received (606).

Figure 7:
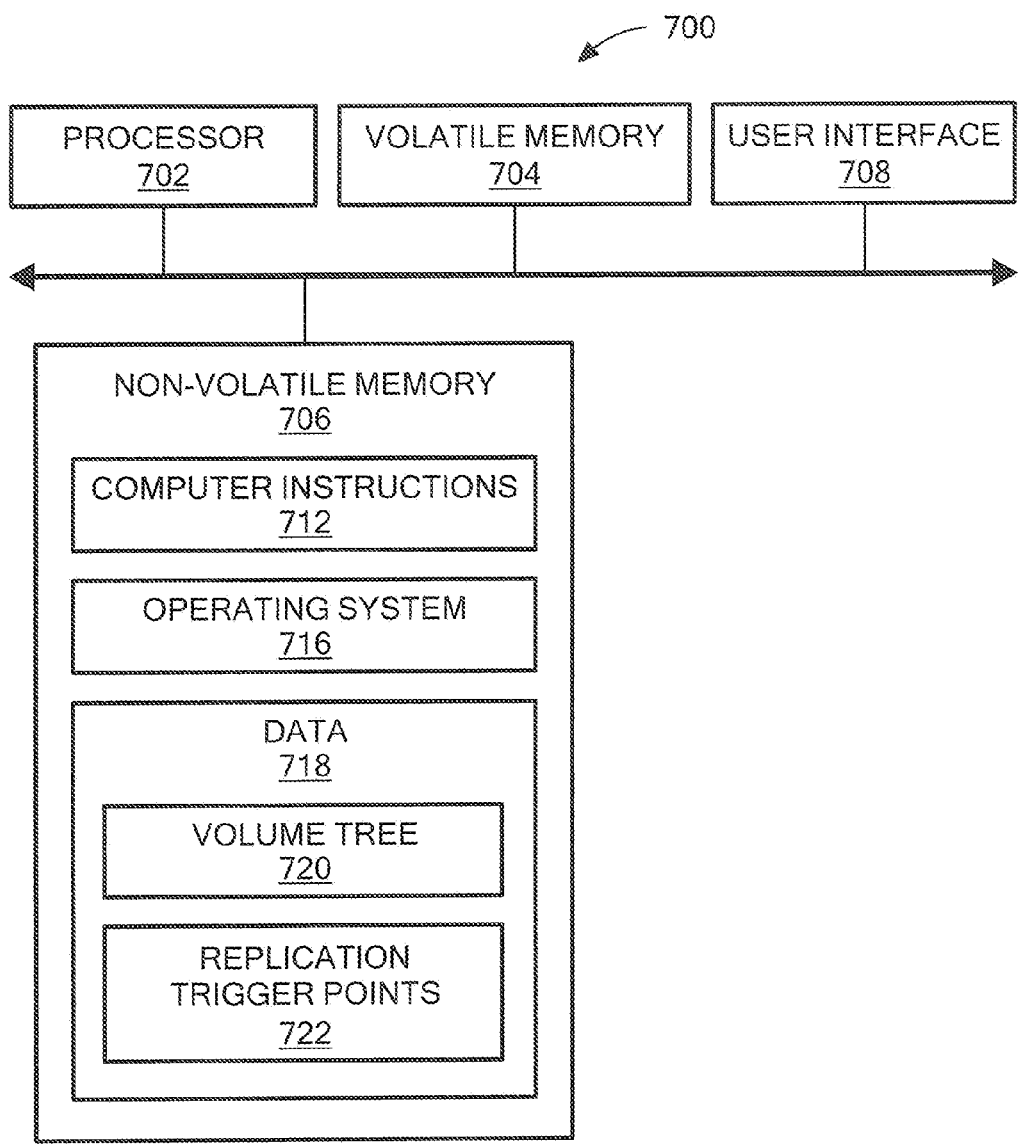
FIG. 7 is a computer on which any of the processes of FIGS. 4 to 6 may be implemented.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718 including a volume tree 720 and replication trigger points 722. In one example, the computer instructions 712 are executed by the processor 702 out of volatile memory 704 to perform all or part of the processes described herein (e.g., processes 400, 500 and 600).

The processes described herein (e.g., processes 400, 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500 and 600 are not limited to the specific processing order of FIGS. 4 to 6, respectively. Rather, any of the processing blocks of FIGS. 4 to 6 may be re-ordered, combined or removed, performed in parallel or in serial, as necessary, to achieve the results set forth above.

The processing blocks (for example, in the processes 400, 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
    receiving notification that a volume in a plurality of volumes has failed;
    determining a smallest consistency group with a replication trigger point designation using a hierarchical volume tree that includes the failed volume;
    stopping replication of volumes in a first consistency group if it is determined that the first consistency group is the smallest consistency group with a replication trigger point that includes the failed volume; and
    stopping replication of the plurality of volumes if it is not determined which is the smallest consistency group with a replication trigger point that includes the failed volume.

2. The method of claim 1, further comprising providing the hierarchical volume tree comprising leaf nodes,
    wherein each of the leaf nodes corresponds to one of the plurality of volumes.

3. The method of claim 2 wherein providing the hierarchical volume tree comprises providing a hierarchical volume tree comprising replication trigger points,
wherein a replication trigger point is used to define the set of volumes whose replication is suspended as a result of a replication failure.

4. The method of claim 1, further comprising allowing each volume or consistency group in the hierarchical volume tree to be a part of exactly one consistency group.

5. The method of claim 1, further comprising allowing an operation on a volume in a consistency group to be allowed on all volumes in the consistency group.

6. The method of claim 1, further comprising allowing a user to:
designate one or more replication trigger points; and
modify or define the hierarchical volume tree.

7. An apparatus, comprising:
electronic hardware circuitry configured to:
receive notification that a volume in a plurality of volumes has failed;
determine a smallest consistency group with a replication trigger point designation using a hierarchical volume tree that includes the failed volume;
stop replication of volumes in a first consistency group if it is determined that the first consistency group is the smallest consistency group with a replication trigger point that includes the failed volume; and
stop replication of the plurality of volumes if it is not determined which is the smallest consistency group with a replication trigger point that includes the failed volume.

8. The apparatus of claim 7 wherein the circuitry comprises at least one of a processor, a memory, a programmable logic device or a logic gate.

9. The apparatus of claim 7, further comprising circuitry configured to provide the hierarchical volume tree comprising leaf nodes,
wherein each of the leaf nodes corresponds to one of the plurality of volumes.

10. The apparatus of claim 9 wherein the circuitry configured to provide the hierarchical volume tree comprises circuitry configured to provide a hierarchical volume tree comprising replication trigger points,
wherein a replication trigger point is used to define the set of volumes whose replication is suspended as a result of a replication failure.

11. The apparatus of claim 7, further comprising circuitry configured to allow each volume or consistency group in the hierarchical volume tree to be a part of exactly one consistency group.

12. The apparatus of claim 7, further comprising circuitry configured to allow an operation on a volume in a consistency group to be allowed on all volumes in the consistency group.

13. The apparatus of claim 7, further comprising circuitry configured to allow a user to:
designate one or more replication trigger points; and
modify or define the hierarchical volume tree.

14. An article comprising:
a non-transitory computer-readable medium that stores computer-executable instructions, the instructions causing a machine to:
receive notification that a volume in a plurality of volumes has failed;
determine a smallest consistency group with a replication trigger point designation using a hierarchical volume tree that includes the failed volume;
stop replication of volumes in a first consistency group if it is determined that the first consistency group is the smallest consistency group with a replication trigger point that includes the failed volume; and
stop replication of the plurality of volumes if it is not determined which is the smallest consistency group with a replication trigger point that includes the failed volume.

15. The article of claim 14, further comprising instructions causing the machine to provide the hierarchical volume tree comprising leaf nodes,
wherein each of the leaf nodes corresponds to one of the plurality of volumes.

16. The article of claim 15 wherein the instructions causing the machine to provide the hierarchical volume tree comprises instructions causing the machine to provide a hierarchical volume tree comprising replication trigger points,
wherein a replication trigger point is used to define the set of volumes whose replication is suspended as a result of a replication failure.

17. The article of claim 14, further comprising instructions causing the machine to allow each volume or consistency group in the hierarchical volume tree to be a part of exactly one consistency group.

18. The article of claim 14, further comprising instructions causing the machine to allow an operation on a volume in a consistency group to be allowed on all volumes in the consistency group.

19. The article of claim 14, further comprising instructions causing the machine to allow a user to:
designate one or more replication trigger points; and
modify or define the hierarchical volume tree.

* * * * *